(12) United States Patent
Benedetti et al.

(10) Patent No.: US 11,621,545 B2
(45) Date of Patent: Apr. 4, 2023

(54) LOW AND MEDIUM VOLTAGE ELECTRICAL ENCLOSURE

(71) Applicant: ABB S.p.A., Milan (IT)

(72) Inventors: Pierceleste Benedetti, Orsenigo (IT); Alessio Bergamini, Gazzaniga (IT); Giuseppe Nava, Ponte Lambro (IT); Federico Gamba, Bergamo (IT)

(73) Assignee: ABB S.p.A., Milan (IT)

( * ) Notice: Subject to any disclaimer, the term of this patent is extended or adjusted under 35 U.S.C. 154(b) by 256 days.

(21) Appl. No.: 17/077,355

(22) Filed: Oct. 22, 2020

(65) Prior Publication Data
US 2021/0119423 A1    Apr. 22, 2021

(30) Foreign Application Priority Data

Oct. 22, 2019 (EP) ..................................... 19204679

(51) Int. Cl.
*H02B 1/30* (2006.01)

(52) U.S. Cl.
CPC .................................. *H02B 1/306* (2013.01)

(58) Field of Classification Search
CPC ........... H02B 1/306; H02B 1/38; H02B 1/44; H02B 1/56; H02B 1/565
See application file for complete search history.

(56) References Cited

U.S. PATENT DOCUMENTS 7,143,762 B2 * 12/2006 Harrison .................. F24S 50/40
126/599
9,078,340 B2 * 7/2015 Cagliani ................ H02B 1/303
(Continued)

FOREIGN PATENT DOCUMENTS

CA    2561695 A1 *  3/2008 ............... E05C 9/02
CA    2824495 A1 *  6/2012 ............. H02B 1/565
(Continued)

OTHER PUBLICATIONS

European Patent Office, Extended Search Report issued in corresponding Application No. 19204679.5, dated Mar. 13, 2020, 8 pp.
(Continued)

*Primary Examiner* — Patrick D Hawn
(74) *Attorney, Agent, or Firm* — Armstrong Teasdale LLP (57) ABSTRACT

A low and medium voltage electrical enclosure comprising a supporting structure which defines an internal space delimited by walls forming one or more compartments housing one or more electrical apparatuses. At least one of said walls is provided with one or more venting openings that put into communication said internal space with the outside of said low voltage electrical enclosure; the venting openings are provided with a cover closing a corresponding venting opening in a first—closed—operating condition. The enclosure is provided with an actuating device adapted to open said cover in a second—open—operating condition in case of arc fault inside said internal space; said actuating device comprises an actuating mechanism having a Shape Memory Alloy-based (SMA-based) actuating element having a first dimension at first predetermined temperatures reversibly changeable into a second dimension at second predetermined temperatures. The reversible change of dimension of said SMA-based actuating element from said first dimension to said second dimension determines the reversible movement of said cover from said first—closed—operating condition to said second—open—operating condition, and vice-versa.

20 Claims, 7 Drawing Sheets

(56) References Cited

U.S. PATENT DOCUMENTS

| | | | |
|---|---|---|---|
| 10,855,059 B2 * | 12/2020 | Valsecchi | H01R 25/161 |
| 10,938,189 B2 * | 3/2021 | Valsecchi | H02B 11/173 |
| 2003/0116413 A1 | 6/2003 | Narusevicius | |
| 2010/0089549 A1 * | 4/2010 | Su | F04D 29/441 165/80.3 |
| 2010/0112924 A1 | 5/2010 | Alexander | |
| 2010/0167636 A1 | 7/2010 | Bhattacharya | |
| 2010/0330894 A1 | 12/2010 | Alexander | |
| 2018/0090914 A1 | 3/2018 | Johnson | |
| 2021/0119425 A1 * | 4/2021 | Benedetti | H02B 1/38 |

FOREIGN PATENT DOCUMENTS

| | | | | |
|---|---|---|---|---|
| CN | 108988176 A | * | 12/2018 | H02B 1/28 |
| CN | 208316074 U | | 1/2019 | |
| CN | 109462163 A | * | 3/2019 | H02B 1/30 |
| JP | S5966305 U | | 5/1984 | |
| JP | S6146839 A | * | 3/1986 | |
| JP | S62147245 A | * | 7/1987 | |
| JP | S62272060 A | * | 11/1987 | |
| JP | H02197781 A | * | 8/1990 | |
| JP | H03226208 A | | 10/1991 | |
| JP | H04125010 A | | 4/1992 | |
| JP | H0622417 A | | 1/1994 | |
| JP | H0698427 A | | 4/1994 | |
| KR | 20200001522 U | * | 7/2020 | |
| KR | 102353884 B1 | * | 1/2022 | |
| SE | 460239 B | | 9/1989 | |

OTHER PUBLICATIONS

European Patent Office, Extended Search Report issued in corresponding Application No. 19204683.7, dated Mar. 13, 2020, 8 pp.

* cited by examiner

LOW AND MEDIUM VOLTAGE ELECTRICAL ENCLOSURE

BACKGROUND

The present invention relates to a low and medium voltage electrical enclosure, in particular a low and medium voltage electrical enclosure which has improved cooling functions and characteristics.

Generally, an enclosure for low and medium voltage electrical distribution is a well-known equipment formed by a supporting structure delimited by lateral, rear, top and bottom walls and closed by a door, which houses in one or more internal compartments electrical apparatuses and equipment, such as, e.g., circuit breakers and/or similar devices, a bus-bar system, electrical instruments, and similar devices.

Under operation it may happen that an internal electrical arc flashes inside the enclosures for a number of reasons. One of the consequences of an internal arc occurrence is a pressure build-up inside one or more compartments of the enclosure.

Normal existing solution usually foresee the presence of one or more openings protected by flaps which under the pressure generated by the electrical arc occurrence are allowed to open so as to allow venting off the gases and restore the normal pressure conditions.

However, the opening of the flaps brings about degradation of the original IP classification and rating with reference to similar enclosures without flaps.

In other words, at the current state of the art, it is difficult for the existing low and medium voltage electrical enclosures have a satisfactory balance between a desirable high IP degree and good performances and resistance in case of an internal arc fault.

SUMMARY

Hence, the present disclosure is aimed at providing a low and medium voltage electrical enclosure, which allows overcoming at least some of the above-mentioned shortcomings.

In particular, the present invention is aimed at providing a low and medium voltage electrical enclosure in which the pressure build-up generated during an internal arc fault can be discharge without irremediably losing the original IP rating.

More in particular, the present invention is aimed at providing a low and medium voltage electrical enclosure where a high IP degree is preserved during normal operations in normal conditions, and a decrease of the IP value takes temporary place only at limited times, during arc flash occurrence.

Furthermore, the present invention is aimed at providing a low and medium voltage electrical enclosure equipped with a device for controlling the build-up of the pressure inside it in case of an internal arc occurrence, that does not require burdensome maintenance intervention.

In addition, the present invention is aimed at providing a low and medium voltage electrical enclosure equipped with a device for controlling the build-up of the pressure inside it in case of an internal arc occurrence, that does not require additional dedicated tests and certifications.

Moreover, the present invention is aimed at providing a low and medium voltage electrical enclosure equipped with a device for controlling the build-up of the pressure inside it in case of an internal arc occurrence, that is reliable and relatively easy to produce at competitive costs.

Thus, the present invention relates to a low and medium voltage electrical enclosure comprising a supporting structure which defines an internal space delimited by walls forming one or more compartments housing one or more electrical apparatuses. The low and medium voltage electrical enclosure of the invention is characterized in that at least one of said walls is provided with one or more venting openings that put into communication said internal space with the outside of said low and medium voltage electrical enclosure, said one or more venting openings being provided with a cover closing a corresponding venting opening in a first—closed—operating condition; the low and medium voltage electrical enclosure is also provided with an actuating device which adapted to open said cover in a second—open—operating condition in case of arc fault inside said internal space. The low and medium voltage electrical enclosure of the invention is further characterized in that said actuating device comprises an actuating mechanism having a Shape Memory Alloy-based (SMA-based) actuating element having a first dimension at first predetermined temperatures reversibly changeable into a second dimension at second predetermined temperatures, the reversible change of dimension of said SMA-based actuating element from said first dimension to said second dimension determining the reversible movement of said cover from said first—closed—operating condition to said second—open—operating condition, and vice-versa.

As better explained in the following description, thanks to the particular structure of the low and medium voltage electrical enclosure according to the invention of the present invention, the above-mentioned problems can be avoided, or at least greatly reduced.

Indeed, under the pressure and temperature conditions occurring in case of an internal arc flash the covers closing the one or more openings in the external walls of the enclosure may be open, thereby venting off the gases developed during the arc and discharging the over-pressure generated. At the same time, the openings allow creating a convective air circulation inside the enclosure so as to keep the temperatures at desired values.

In other words, under the arc flash conditions the IP classification of the enclosure may temporarily vary, due to the open status of the covers and corresponding openings. As soon as the temperature is restored below a certain predetermined value, the covers are moved back into the closed position, thereby restoring the original IP degree.

As better explained in the following description, the movement of the covers from the closed to the open conditions and, more in particular, from the open conditions to the closed conditions, is determined and controlled by temperature sensitive actuators, i.e. by actuators that operate according to temperature variations without requiring any additional power feed or a dedicated control system.

In this connection, the actuators used in the enclosures according to the present disclosure are formed by a Shape Memory Alloy-based (SMA-based) actuating element.

Shape Memory Alloys are well known materials—that will not be described in further details—having the capability of changing their dimensions reversibly depending on the temperature conditions. Their response time to the temperature variations is very fast and during their change of dimensions they are able to exert a force which is enough to actuate relatively simple mechanism. Moreover, their temperature coefficient (i.e. the temperature value or range at which they undergo a certain dimensional variation) can be tailored and fine-tuned according to the needs by selecting the appropriate materials according to known criteria.

In other words, the SMA-based actuating elements used in the enclosure according to the present invention change their dimension depending on the temperature conditions inside the enclosure.

In particular, at first predetermined temperature conditions the SMA-based actuating element has a first dimension while at second predetermined temperature conditions the SMA-based actuating element has a second dimension. By connecting operatively the SMA-based actuating element to the cover(s) it is therefore possible to move said cover(s) from the closed position to the open position, and vice-versa, depending on the temperature conditions inside the enclosure. Thus, for instance, when the temperatures inside the enclosure increase rapidly above a predetermined level due to an internal arc flash, the covers are rapidly moved from the closed position to the open position thereby allowing a discharge of the overpressure generated by the arc flash.

In this condition a temporary, controlled, convective air circulation inside the enclosure takes place, thereby allowing cooling of the enclosure. At the same time, a temporary change of the IP classification of the enclosure is allowed. Then, when the temperatures goes back below said predetermined level the covers are moved back from the open position to the closed position thereby also restoring the original IP classification.

The SMA-based actuating element can be based on a Shape Memory Alloy having a negative temperature coefficient, i.e. a Shape Memory Alloy shrinking when the temperature exceeds a predetermined value or range. In this case, the SMA-based actuating element will decrease its operating dimensions (i.e. it will shorten) when the temperature exceeds said predetermined value or range.

Alternatively, the SMA-based actuating element can be based on a Shape Memory Alloy having a positive temperature coefficient, i.e. a Shape Memory Alloy expanding when the temperature exceeds a predetermined value or range. In this case, the SMA-based actuating element will increase its operating dimensions (i.e. it will lengthen) when the temperature exceeds said predetermined value or range.

In addition, due to the very simple operating principles of the SMA-based actuating element (e.g. a linear displacement depending on the temperature), it is worth noting that the actuating mechanism coupling the SMA-based actuating element with the cover(s) can be very simple, and therefore very easy to manufacture and maintain.

In a preferred embodiment of the low and medium voltage electrical enclosure, according to the present invention, the one or more covers are hinged on a rim portion of a corresponding opening. The covers are then pivotally movable between said first—closed—operating condition to said second—open—operating condition, and vice-versa, thanks to the action of the SMA-based actuating element.

In a largely preferred embodiment of the low and medium voltage electrical enclosure of the present invention, the SMA-based actuating element advantageously comprises a bar or wire having a first predetermined length at said first predetermined temperatures and a second predetermined length at second first predetermined temperatures. In practice, according to this embodiment, the SMA-based actuating element will shorten or lengthen depending on the temperature condition, with a linear actuating direction along its longitudinal extension, thereby making very easy its coupling with the actuating mechanism of the cover.

For instance, in such a case, said actuating mechanism may conveniently comprise a lever having a first end which is operatively connected to said cover and a second end which is operatively connected to a first end of said bar or wire. The linear displacement of the SMA-based actuating element is therefore immediately transferred to the cover in a very simple manner.

Then, in a particular embodiment of the low and medium voltage electrical enclosure of the invention, said bar or wire has a second end which is preferably secured on a fixed point of said enclosure. In practice, according to this embodiment, the movement of the SMA-based actuating element takes place in one direction only, as better explained hereinafter.

Alternatively, in a particular embodiment of the low and medium voltage electrical enclosure of the invention, the enclosure comprises one or more couples of first and second openings which are provided with a corresponding first and second cover. In this embodiment, the SMA-based actuating element advantageously comprises a bar or wire having a first predetermined length at said first predetermined temperatures and a second predetermined length at second first predetermined temperatures. Moreover, the actuating mechanism comprises a first and a second lever each having a first end respectively connected to said first and second cover. Then, said bar or wire has advantageously a first end which is operatively connected to said first lever and a second end which is operatively connected to said second lever.

In practice, according to this embodiment, the SMA-based actuating element is positioned between two openings and corresponding covers and its movement takes place in two directions, simultaneously acting on said first and second lever, as better explained hereinafter.

In a particular embodiment of the low and medium voltage electrical enclosure, according to the present invention, the rim of said opening is raised with respect to the surface of the corresponding wall on which it is positioned.

In particular, in such a case, said cover may advantageously comprise a first portion which extends from the rim portion onto which said cover is hinged over said opening, and a second portion which extends from said rim portion opposite to said opening.

In practice, according to this embodiment, the weight of the first portion of said cover is at least partially counterbalanced by the second portion of said cover which extends in an opposite direction with respect to the rotation axis of the cover. In this way the movement of the cover from the closed position to the open position, and vice-versa, requires only a minimum amount of actuating energy, due to the overall balanced weight of the cover with respect to its rotation axis.

In a preferred embodiment of the low and medium voltage electrical enclosure of the present invention, the SMA-based actuating element has a negative temperature coefficient, i.e. said first predetermined temperatures are lower than said second predetermined temperatures and said first dimension of said SMA-based actuating element is greater than said second dimension of said SMA-based actuating element.

Number and positioning of the venting openings on the walls of the low and medium voltage electrical enclosure can vary according to the needs.

For instance, said one or more venting openings can advantageously be positioned on the top wall of said enclosure, since such position is normally relatively safe for venting off the gases discharged in case of internal arc.

Alternatively to, or in combination with, the previously described embodiment, said one or more venting openings can also be positioned on a lateral wall of said enclosure, depending also from safety considerations.

BRIEF DESCRIPTION OF THE FIGURES

Further features and advantages of the present invention will be more clear from the description of preferred but not exclusive embodiments of a low and medium voltage electrical enclosure according to the invention, shown by way of examples in the accompanying drawings, wherein.

DETAILED DESCRIPTION

With reference to the attached figures, a low and medium voltage electrical enclosure, designated in the various embodiments with the reference numeral 1, in its more general definition comprises a supporting structure 11 which defines an internal space delimited by a top wall 13, lateral walls 14, and having one or more compartments housing one or more electrical apparatuses.

One of distinguishing features of a low and medium voltage electrical enclosure 1 of the present invention is given by the fact that at least one of said external walls 13, 14 is provided with one or more venting openings 20, 30 that put into communication said internal space with the outside of the low and medium voltage electrical enclosure 1, 10, 100.

The venting openings 20, 30 are conveniently provided with a corresponding cover 21, 31 closing said venting opening 20, 30 in a first—closed—operating condition at first predetermined temperatures. The electrical enclosure 1 is also conveniently provided with an actuating device 40 which is adapted to move said cover 21, 31 from said first—closed—operating condition to a second—open—operating condition at second predetermined temperatures.

A further distinguishing features of the low and medium voltage electrical enclosure 1 of the present invention is given by the fact that said actuating device 40 conveniently comprises an actuating mechanism 41 having a Shape Memory Alloy-based (SMA-based) actuating element 42, 421 having a first dimension at said first predetermined temperatures reversibly changeable into a second dimension at said second predetermined temperatures.

Thus, when said SMA-based actuating element 42, 421 reversibly changes its dimension from said first dimension to said second dimension, a reversible movement of said cover 21, 31 from said first—closed—operating condition to said second—open—operating condition, and vice-versa, is thereby determined.

Under the open condition, a controlled convective ventilation of the low and medium voltage electrical enclosure 1 is therefore possible, until when the temperature is restored below said first predetermined temperatures. At this point, the SMA-based actuating element 42, 421 changes its dimension from said second dimension to said first dimension, thereby moving said cover 21, 31 from said second—open—operating condition to said first—closed—operating condition and restoring the original closed conditions of the enclosure 1 and the original IP rating.

As shown in the attached figures, in a preferred embodiment of the presently disclosed low and medium voltage electrical enclosure 1 the cover 21, 31 can be hinged on a rim portion 211, 311 of a corresponding opening 20, 30. The cover 21, 31 is then pivotally movable between said first—closed—operating condition and said second—open—operating condition, according to the previously described mechanism, by rotating around the hinging axis.

In a largely preferred embodiment of the low and medium voltage electrical enclosure 1 of the present invention, the SMA-based actuating element 42, 421 preferably comprises a bar or wire which has a first predetermined length at said first predetermined temperatures and a second predetermined length at second first predetermined temperatures.

As shown in the attached figures, when the SMA-based actuating element 42, 421 is formed by bar or wire, the actuating mechanism can be very simple. In particular, with reference to FIGS. 3 and 5, in such a case said actuating mechanism 41 can advantageously comprise a lever 51 which have a first end 511 operatively connected to a corresponding cover 21, 31 and a second end 512 which is operatively connected to a first end 43, 431 of said bar or wire 42, 421.

Figure 3A:
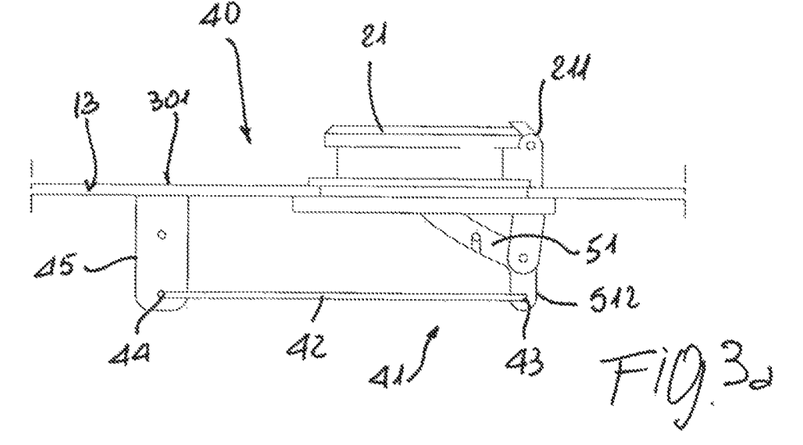
FIG. 3a is a first side view of a first embodiment of a cover and corresponding actuating device used in an enclosure according to the invention, in a first—closed—operating condition.
Figure 3B:
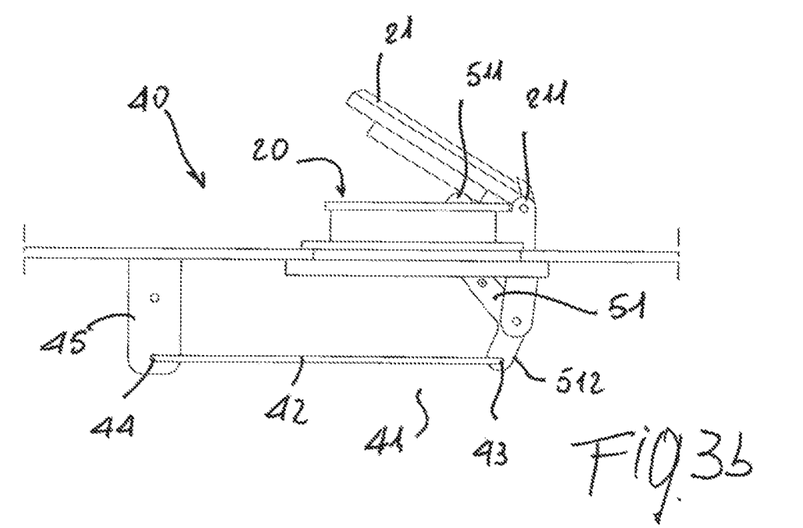
FIG. 3b is a second side view of a first embodiment of a cover and corresponding actuating device used in an enclosure according to the invention, in a second—open—operating condition.

In embodiments of the low and medium voltage electrical enclosure 1 shown in FIGS. 3a and 3b said bar or wire 42 has a second end 44 which is secured on a fixed point 45 of said enclosure 1. The movement of the SMA-based actuating element 42 therefore takes place in one direction only, with the first end 43 of the bar or wire 42 acting on the second end 512 of the lever, thereby determining its displacement and the consequent movement of the cover 21 from the closed to the open position, and vice-versa.

Figures 4A, 4B:
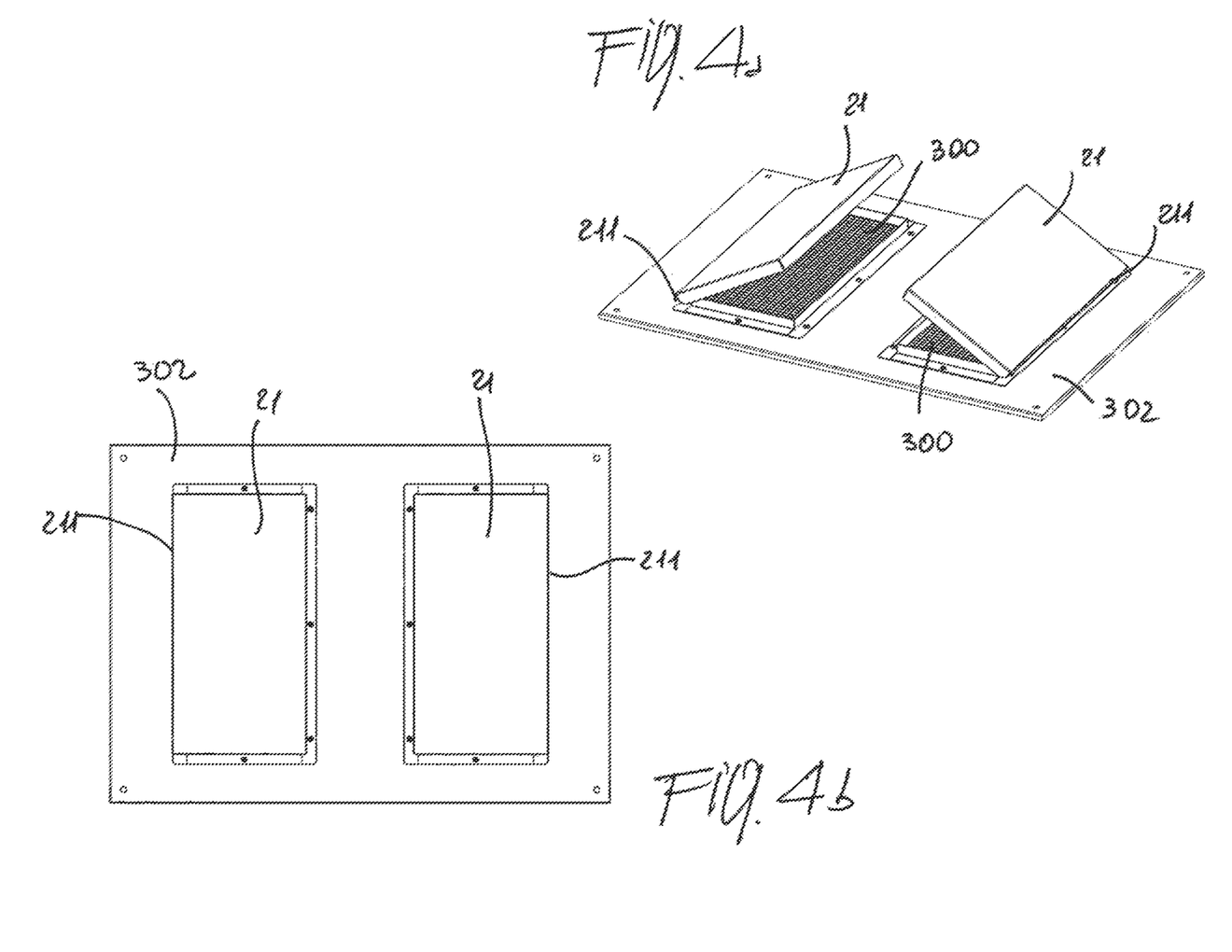
FIG. 4a is a perspective view of a second embodiment of a cover and corresponding opening used in an enclosure according to the invention, in a second—open—operating condition.
FIG. 4b is a front view of a second embodiment of a cover and corresponding opening used in an enclosure according to the invention, in a first—closed—operating condition.
Figures 7A, 7B, 7C:
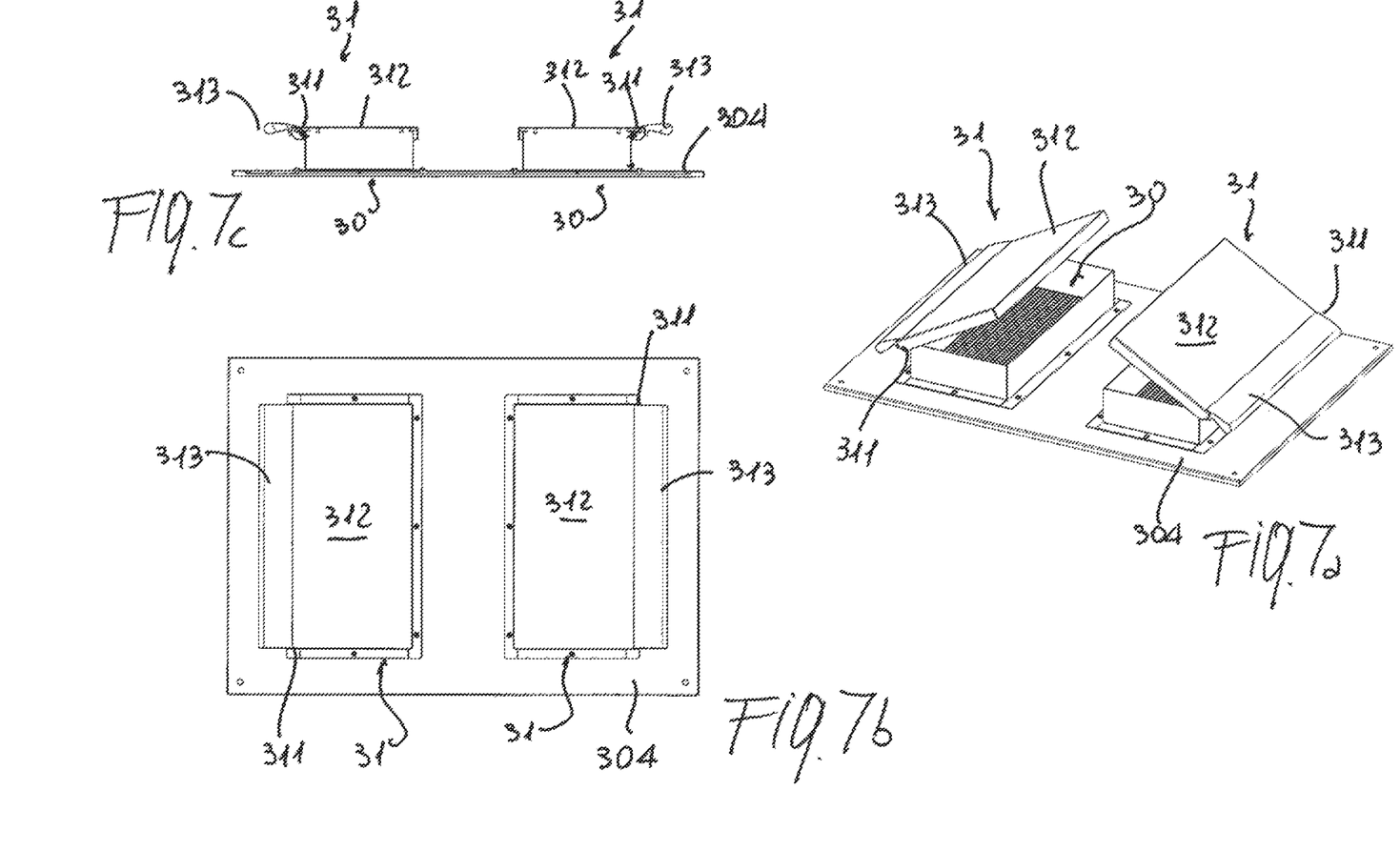
FIG. 7a is a perspective view of a fourth embodiment of a cover and corresponding opening used in an enclosure according to the invention, in a second—open—operating condition.
FIG. 7b is a front view of a fourth embodiment of a cover and corresponding opening used in an enclosure according to the invention, in a first—closed—operating condition.
FIG. 7c is a side view of a fourth embodiment of a cover and corresponding opening used in an enclosure according to the invention, in a first—closed—operating condition.

In an alternative embodiment of the low and medium voltage electrical enclosure 1 shown in FIGS. 4 and 7, the electrical enclosure 1 advantageously comprises one or more couples of first and second venting openings 20 (and 30) which are provided with corresponding couples of first and second cover 21 (and 31).

Figure 5A:
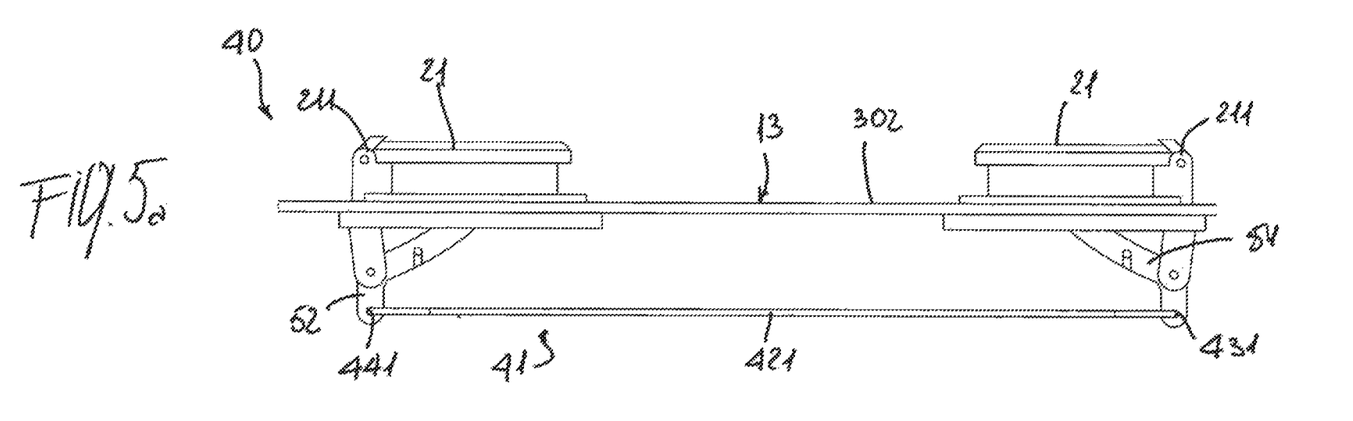
FIG. 5a is a first side view of a second embodiment of a cover and corresponding actuating device used in an enclosure according to the invention, in a first—closed—operating condition.
Figure 5B:
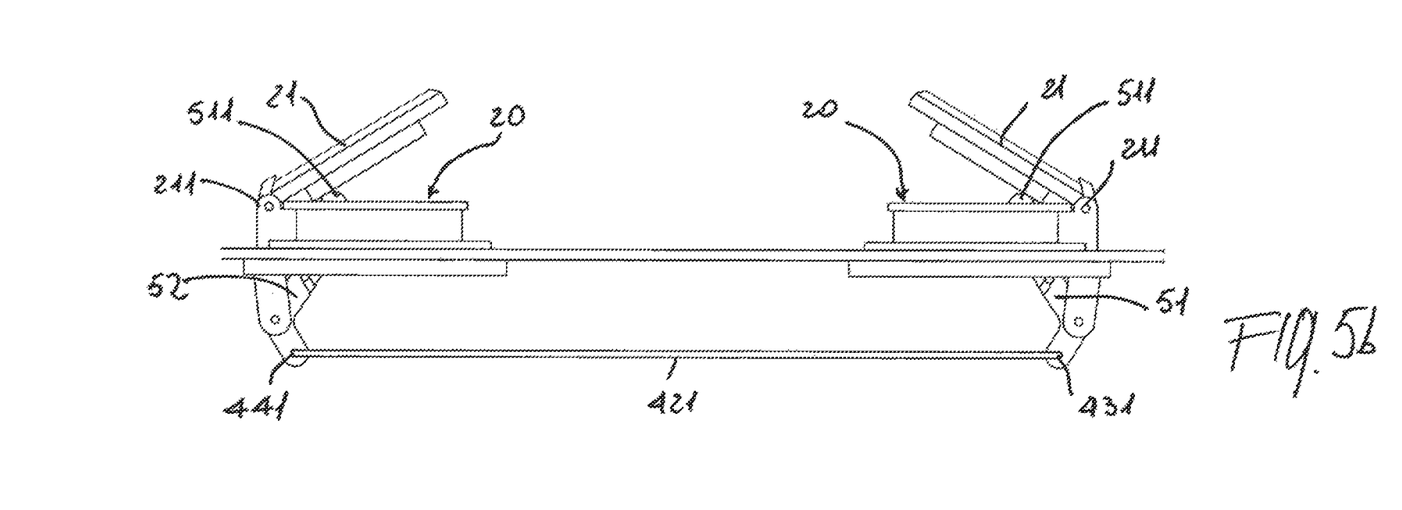
FIG. 5b is a second side view of a second embodiment of a cover and corresponding actuating device used in an enclosure according to the invention, in a second—open—operating condition.

In this case, with reference to FIGS. 5*a* and 5*b*, the SMA-based actuating element 421 advantageously comprises a bar or wire having a first predetermined length at said first predetermined temperatures and a second predetermined length at said second predetermined temperatures. In turn, the actuating mechanism 41 advantageously comprises a first 51 and a second lever 52 each having a first end 511 respectively connected to said first and second cover 21 (and 31). Moreover, said bar or wire 421 has a first end 431 which is operatively connected to said first lever 51 and a second end 441 which is operatively connected to said second lever 52.

In practice, according to this embodiment, the SMA-based actuating element 421 is positioned between two venting openings 20 (and 30) and corresponding covers 21 (and 31) mirroring each other. The movement of the bar or wire 421 takes place in two opposite directions, simultaneously acting on said first 51 and second 52 lever, with the first end 431 of the bar or wire 421 acting on the first lever 51 and the second end 441 of the bar or wire 421 acting on the second lever 52, thereby determining their displacement in opposite directions and the consequent movement of the covers 21 (and 31) from the closed to the open position, and vice-versa.

Figure 6B:
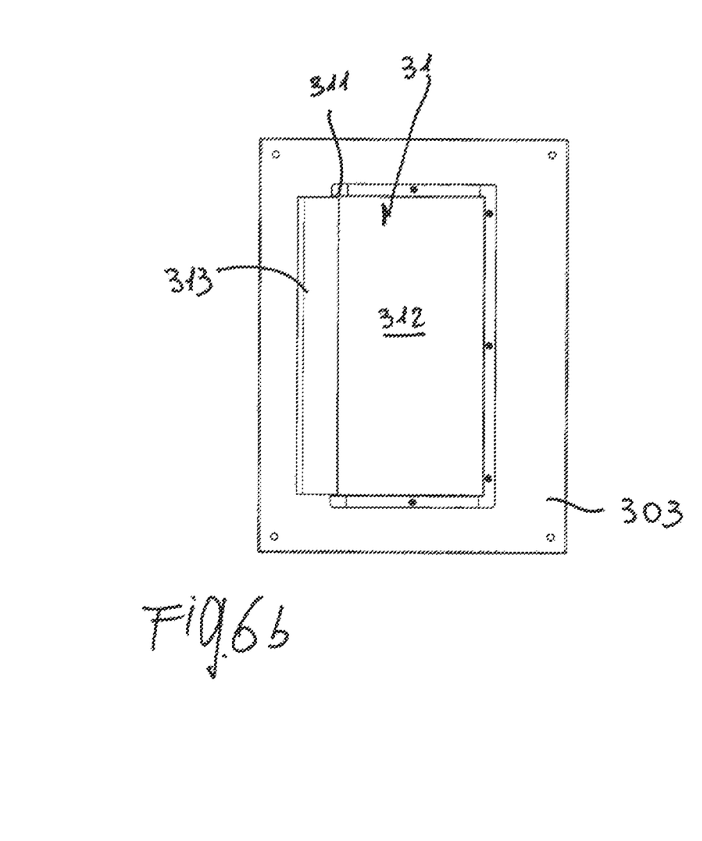
FIG. 6b is a front view of a third embodiment of a cover and corresponding opening used in an enclosure according to the invention, in a first—closed—operating condition.
Figure 6C:
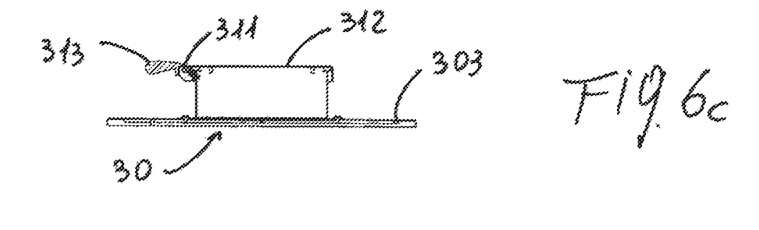
FIG. 6c is a side view of a third embodiment of a cover and corresponding opening used in an enclosure according to the invention, in a first—closed—operating condition.
Figure 6D:
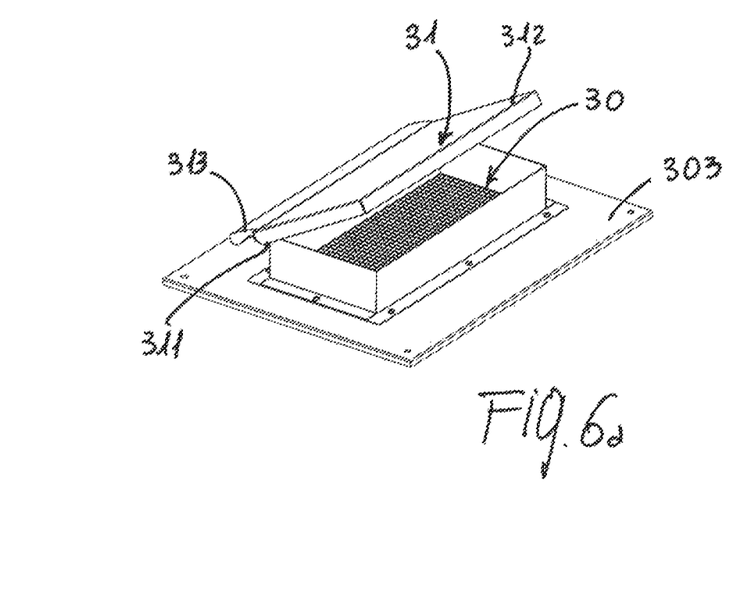
FIG. 6a is a perspective view of a third embodiment of a cover and corresponding opening used in an enclosure according to the invention, in a second—open—operating condition.

With reference to FIGS. 6 and 7, in a particular embodiment the low and medium voltage electrical enclosure 1 of the present disclosure, the rim of said opening 30 is raised with respect to the surface of the corresponding wall on which it is positioned.

Then, according to a preferred embodiment, the cover 31 is hinged on a rim portion 311 and advantageously comprises a first portion 312 extending from said rim portion 311 in the direction and over said opening 30. The cover 31 further comprises a second portion 313 extending from said rim portion 311 in a direction opposite to said opening 30 and to said first portion 312.

As previously said, according to this embodiment, the second portion 313 of said cover 31 at least partially counterbalance the weight of said first portion 312 of said cover 31, thereby making easier the rotation of the cover 31 around the hinging axis.

Figure 2A:
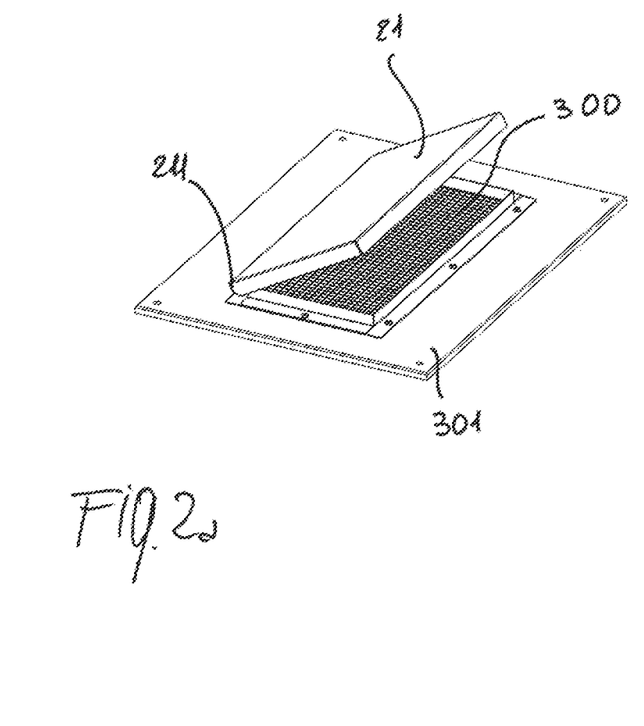
FIG. 2a is a perspective view of a first embodiment of a cover and corresponding opening used in an enclosure according to the invention, in a second—open—operating condition.
Figure 2B:
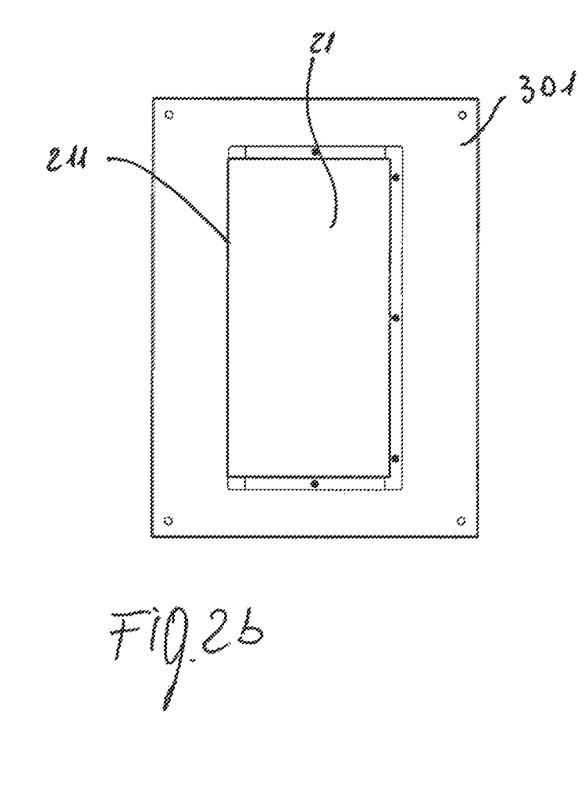
FIG. 2b is a front view of a first embodiment of a cover and corresponding opening used in an enclosure according to the invention, in a first—closed—operating condition.

The actuating mechanism and element used to move the covers 31 in FIGS. 6 and 7 are not shown, but they basically can be substantially similar to those used for the embodiments of FIGS. 2 and 4 and represented in FIGS. 3 and 5.

Also, the openings, covers and actuating device can formed directly on one of the external walls of the enclosure 1 or can be formed on a plate 301, 302, 303, and 304 mountable on one of said external walls.

In the embodiment of the low and medium voltage electrical enclosure 1 shown in the attached figures, said first predetermined temperatures are lower than said second predetermined temperatures and the first dimension of said SMA-based actuating element 42, 421 is greater than said second dimension of said SMA-based actuating element 42, 421.

In other words, in the embodiments shown, the SMA-based actuating element 42, 421 is based on a Shape Memory Alloy having a negative temperature coefficient, i.e. a Shape Memory Alloy shrinking when the temperature exceeds a predetermined value or range. Thus, the SMA-based actuating element 42, 412 shortens when the temperature exceeds said predetermined value or range.

Alternatively, according to embodiment not shown, but which are based on a reversal of the operating conditions, the SMA-based actuating element 42, 421 can be based on a Shape Memory Alloy having a positive temperature coefficient, i.e. a Shape Memory Alloy expanding when the temperature exceeds a predetermined value or range. In this case, the SMA-based actuating element 42, 421 will increase its operating dimensions (i.e. it will lengthen) when the temperature exceeds said predetermined value or range.

Figure 1:
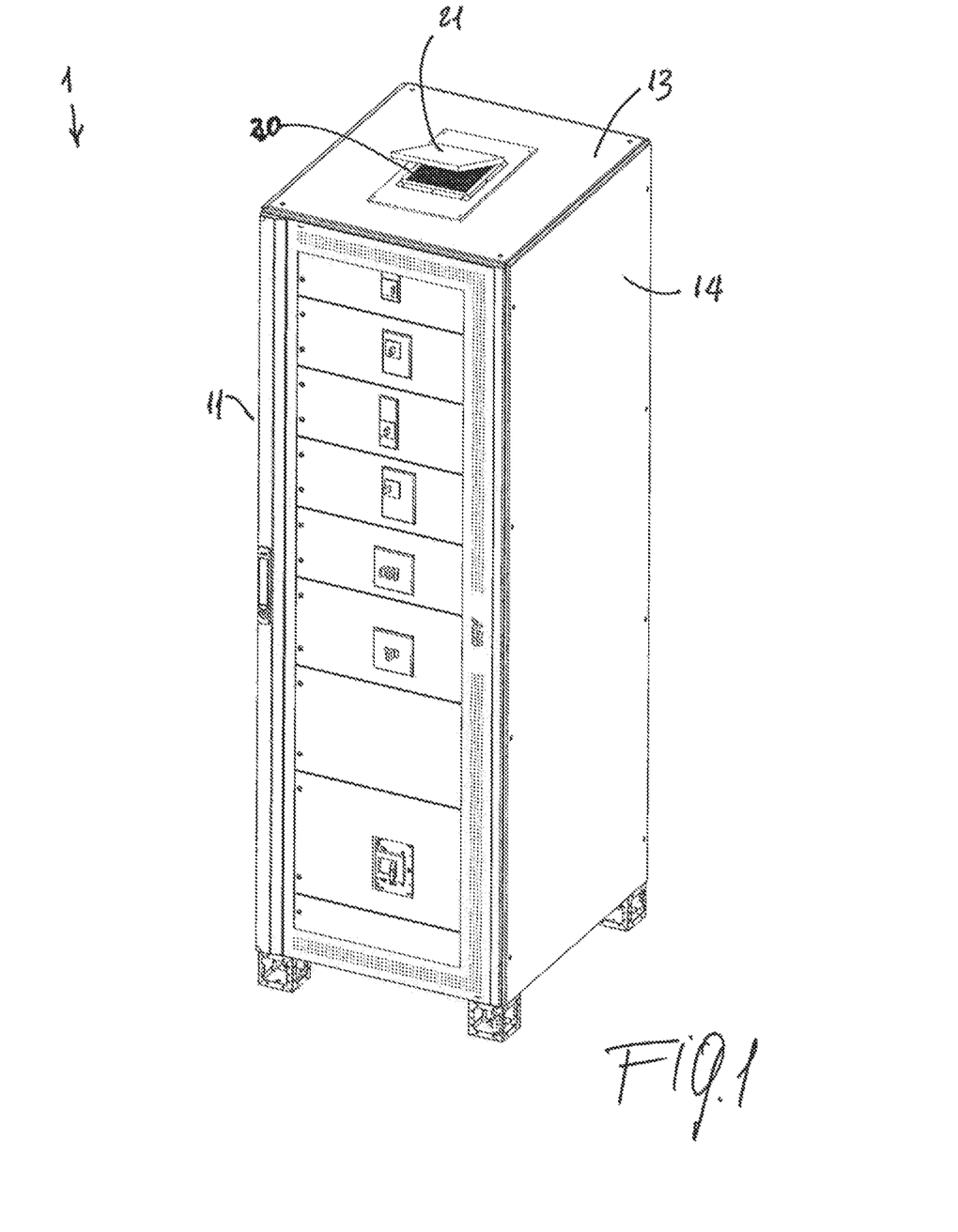
FIG. 1 is a perspective view of a first embodiment of a low and medium voltage electrical enclosure according to the invention.

With reference to FIG. 1, in an embodiment of the low and medium voltage electrical enclosure 1 of the invention, the venting openings 20 are positioned on the top wall 14 of said enclosure 1. This location is largely preferable due to safety consideration. However, as previously said, the positioning of the venting openings 20 may vary, depending on the likelihood of arc flashes in the various compartments inside the enclosure 1.

It is clear that, for what concerns number and positioning of the venting openings 20, 30 in the low and medium voltage electrical enclosure 1 of the present invention, any combination of the previously described embodiment is also possible depending on the needs and the layout of the enclosure.

Since the dimensions of the openings 20, 30 are relatively wide, and/or when it may be advisable to have some kind of protection thereon, a net or mesh 300 can be conveniently positioned in correspondence of said openings.

It is clear from the above description that the low and medium voltage electrical enclosure of the present invention, fully achieve the intended aims and solved the above-highlighted problems of the existing enclosures.

In particular, in the low and medium voltage electrical enclosure of the present invention, it is possible to have a satisfactory balance between a desirable high IP degree and good performances and resistance in case of an internal arc fault.

Indeed, in the low and medium voltage electrical enclosure of the present invention, the pressure build-up generated during an internal arc fault can be discharge without irremediably losing the original IP rating.

A high IP degree is therefore preserved during normal operations in normal conditions, while a decrease of the IP value takes temporary place only at limited times, during arc flash occurrence. Furthermore, it is worth noting that the device for controlling the temperature and the build-up of the pressure in case of an internal arc occurrence—used in the low and medium voltage electrical enclosure of the present invention—does not require burdensome maintenance intervention.

Moreover, the temperature variations inside can be easily controlled by predetermining the closing/opening temperatures of the covers of the venting openings and consequently selecting the appropriate material for the SMA-based actuating element.

In this way, the actuating device used in the low and medium voltage electrical enclosure of the present invention does not require dedicated cabling and power feed and is very easy and quick to install.

As a consequence also of the very simple structure of the device for controlling the temperature variations inside the enclosure, the maintenance intervention are normally unnecessary or they are very simple and quick to perform.

Several variations can be made to the low and medium voltage electrical enclosure thus conceived all falling within the scope of the attached claims. In practice, the materials used and the contingent dimensions and shapes can be any, according to requirements and to the state of the art.

The invention claimed is:

1. A voltage electrical enclosure comprising a supporting structure which defines an internal space delimited by walls forming one or more compartments housing one or more electrical apparatuses, wherein at least one of said walls is provided with one or more venting openings that put into communication said internal space with an outside of said voltage electrical enclosure, said one or more venting openings being provided with a cover closing a corresponding venting opening in a first—closed—operating condition and with an actuating device adapted to open said cover in a second—open—operating condition in case of arc fault inside said internal space, and wherein said actuating device comprises an actuating mechanism having a Shape Memory Alloy-based, or SMA-based, actuating element having a first dimension at first predetermined temperatures reversibly changeable into a second dimension at second predetermined temperatures, a reversible change of dimension of said SMA-based actuating element from said first dimension to said second dimension determining a reversible movement of said cover from said first—closed—operating condition to said second—open—operating condition, and vice-versa, wherein said actuating mechanism comprises a lever having a first end operatively connected to said cover and a second end operatively connected to said SMA-based actuating element, wherein said lever is configured to pivot on a pivot axis in response to said reversible change of dimension of said SMA-based actuating element to translate said cover between said first—closed—operating condition and said second—open—operating condition, and wherein said lever includes a bend proximate to said pivot axis.

2. The voltage electrical enclosure, according to claim 1, wherein said cover is hinged on a rim portion of a corresponding opening and pivotally movable between said first—closed—operating condition to said second—open—operating condition.

3. The voltage electrical enclosure, according to claim 2, wherein said SMA-based actuating element comprises a bar or wire having a first predetermined length at said first predetermined temperatures and a second predetermined length at second first predetermined temperatures.

4. The voltage electrical enclosure, according to claim 3, wherein said lever has said second end operatively connected to a first end of said bar or wire.

5. The voltage electrical enclosure, according to claim 4, wherein said bar or wire has a second end secured on a fixed point of said voltage electrical enclosure.

6. The voltage electrical enclosure, according to claim 1, further comprising one or more couples of first and second venting openings provided with a corresponding first and second cover, and in that said SMA-based actuating element comprises a bar or wire having a first predetermined length at said first predetermined temperatures and a second predetermined length at said second predetermined temperatures, said actuating mechanism comprising a first and a second lever each having a first end respectively connected to said first and second cover, said bar or wire having a first end operatively connected to said first lever and a second end connected to said second lever.

7. The voltage electrical enclosure, according to claim 5, wherein said rim portion of said opening is raised with respect to a surface of a corresponding wall on which it is positioned.

8. The voltage electrical enclosure, according to claim 7, wherein said cover comprises a first portion extending from said rim portion in which said cover is hinged over said opening and a second portion extending from said rim portion opposite to said opening.

9. The voltage electrical enclosure, according to claim 8, wherein said second portion of said cover at least partially counterbalance a weight of said first portion of said cover.

10. The voltage electrical enclosure, according to claim 9, wherein said first predetermined temperatures are lower than said second predetermined temperatures and in that said first dimension of said SMA-based actuating element is greater than said second dimension of said SMA-based actuating element.

11. The voltage electrical enclosure, according to claim 1, wherein said one or more venting openings are positioned on a top wall of said electrical voltage enclosure.

12. The voltage electrical enclosure, according to claim 1, wherein said one or more venting openings are positioned on a lateral wall of said electrical voltage enclosure.

13. The voltage electrical enclosure, according to claim 1, wherein said SMA-based actuating element comprises a bar or wire having a first predetermined length at said first predetermined temperatures and a second predetermined length at said second predetermined temperatures.

14. The voltage electrical enclosure, according to claim 13, wherein said lever has said second end operatively connected to a first end of said bar or wire.

15. The voltage electrical enclosure, according to claim 14, wherein said bar or wire has a second end secured on a fixed point of said electrical voltage enclosure.

16. The voltage electrical enclosure, according to claim 2, wherein said rim portion of said opening is raised with respect to a surface of a corresponding wall on which it is positioned.

17. The voltage electrical enclosure, according to claim 1, wherein said first predetermined temperatures are lower than said second predetermined temperatures and in that said first dimension of said SMA-based actuating element is greater than said second dimension of said SMA-based actuating element.

18. The voltage electrical enclosure, according to claim 2, further comprising one or more couples of first and second venting openings provided with a corresponding first and second cover, and in that said SMA-based actuating element comprises a bar or wire having a first predetermined length at said first predetermined temperatures and a second predetermined length at said second predetermined temperatures, said actuating mechanism comprising a first and a second lever each having a first end respectively connected to said first and second cover, said bar or wire having a first end operatively connected to said first lever and a second end connected to said second lever.

19. The voltage electrical enclosure, according to claim 16, wherein said cover comprises a first portion extending from said rim portion in which said cover is hinged over said opening and a second portion extending from said rim portion opposite to said opening.

20. The voltage electrical enclosure, according to claim 10, wherein said one or more venting openings are positioned on a lateral wall of said electrical voltage enclosure.

* * * * *